United States Patent
Scherer et al.

(10) Patent No.: US 12,305,041 B2
(45) Date of Patent: May 20, 2025

(54) METHOD FOR PRODUCING PLATELET-SHAPED PIGMENTS

(71) Applicant: GIESECKE+DEVRIENT CURRENCY TECHNOLOGY GMBH, Munich (DE)

(72) Inventors: Maik Rudolf Johann Scherer, Grainau (DE); Kai Herrmann Scherer, Munich (DE); Michael Sobol, Munich (DE); Sebastian Wetter, Schaftlach (DE); Florian Frohlich, Warngau (DE); Manfred Heim, Bad Tolz (DE); Thomas Gegenfurtner, Valley Unterdarching (DE); Andreas Rauch, Ohlstadt (DE); Norbert Vogt, Warngau (DE); Ivo Quirino, Aurach (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 91 days.

(21) Appl. No.: 18/032,440

(22) PCT Filed: Sep. 21, 2021

(86) PCT No.: PCT/EP2021/025356
§ 371 (c)(1),
(2) Date: Apr. 18, 2023

(87) PCT Pub. No.: WO2022/083887
PCT Pub. Date: Apr. 28, 2022

(65) Prior Publication Data
US 2023/0392019 A1    Dec. 7, 2023

(30) Foreign Application Priority Data
Oct. 20, 2020 (DE) .......................... 102020006457.4

(51) Int. Cl.
C09C 3/04 (2006.01)
B32B 43/00 (2006.01)
C09C 1/00 (2006.01)

(52) U.S. Cl.
CPC ............ *C09C 1/006* (2013.01); *B32B 43/006* (2013.01); *C09C 1/0015* (2013.01); *C09C 3/041* (2013.01);
(Continued)

(58) Field of Classification Search
CPC .............. B32B 43/006; C01P 2004/20; C01P 2004/80; C09C 1/0015; C09C 3/04;
(Continued)

(56) References Cited

U.S. PATENT DOCUMENTS 5,135,812 A    8/1992 Phillips et al.
6,410,130 B1   6/2002 Schuhmacher et al.
(Continued)

FOREIGN PATENT DOCUMENTS

DE    19738369 A1    3/1999
EP    3000911 A1 *   3/2016    ............... C09C 1/64
(Continued)

OTHER PUBLICATIONS

Translation of EP 3000911 A1 (published on Mar. 30, 2016).*
(Continued)

*Primary Examiner* — Leo B Tentoni
(74) *Attorney, Agent, or Firm* — Workman Nydegger

(57) ABSTRACT

A method is provided for producing platelet-shaped pigments, including the steps of: providing a film structure which has a carrier substrate, a water-soluble release layer and a pigment material layer; mechanically disrupting the pigment material layer, which is present in the film structure, at specific locations; soaking the film structure with aqueous solution; subjecting the film structure to a mechanical force
(Continued)

so that the pigment material layer is detached from the carrier substrate as a plurality of pigments according to the ruptures present at the specific locations.

14 Claims, 2 Drawing Sheets

(52) U.S. Cl.
CPC ...... *C01P 2004/20* (2013.01); *C01P 2004/80* (2013.01); *C09C 2200/10* (2013.01); *C09C 2200/1054* (2013.01); *C09C 2200/24* (2013.01); *C09C 2220/00* (2013.01); *C09C 2220/20* (2013.01)

(58) Field of Classification Search
CPC ................ C09C 3/041; C09C 2200/10; C09C 2200/1054; C09C 2200/24; C09C 2220/00; Y10T 156/11; Y10T 156/1111; Y10T 156/1121; Y10T 156/1195
USPC ......... 264/140, 442; 156/701, 703, 705, 719
See application file for complete search history.

(56) References Cited

U.S. PATENT DOCUMENTS

| | | | |
|---|---|---|---|
| 2001/0007696 A1* | 7/2001 | Kaupp | ............... C23C 14/20 427/327 |
| 2015/0033987 A1* | 2/2015 | Schmid | ................ B22F 1/068 106/404 |
| 2015/0337137 A1 | 11/2015 | Szuscik-Machnicki et al. | |
| 2020/0283636 A1 | 9/2020 | Fuhse et al. | |
| 2020/0291238 A1 | 9/2020 | Scherer et al. | |

FOREIGN PATENT DOCUMENTS

| | | |
|---|---|---|
| WO | 2019057321 A1 | 3/2019 |
| WO | 2019057322 A1 | 3/2019 |
| WO | 2021115628 A1 | 6/2021 |

OTHER PUBLICATIONS

International Search Report from corresponding PCT Application No. PCT/EP2021/025356, Jan. 17, 2022.

German Search Report from corresponding German Application No. 102020006457.4, May 20, 2021.

* cited by examiner

METHOD FOR PRODUCING PLATELET-SHAPED PIGMENTS

BACKGROUND

The invention relates to a method for producing platelet-shaped pigments.

Data carriers, such as documents of value or identity, but also other articles of value, such as branded goods for instance, are often endowed for safeguarding with effect pigments which allow the authenticity of the data carrier to be verified and which at the same time serve as protection against unauthorized reproduction. Effect pigments, for example, may be integrated into the substrate of the data carrier or applied to the substrate of the data carrier.

Possible ways of producing pigments, such as effect pigments for instance, include the coating of a carrier material, such as a carrier film for instance, with a thin-layer system having an optically variable effect, with the coating then being detached from the carrier material and ground into small fragments (see, for example, WO 2019/057321 A1). These fragments, as pigments, can be dispersed in a binder and finally printed. The controlled detachment of the coating from the flexible carrier material is accomplished, for example, by means of a special release coating or release layer whose nature is such that the adhesion of the coating for detachment on the carrier material provided with the release layer is poor. Detachment may be accomplished, for example, by subjecting the layer structure for detachment to mechanical stress, by rubbing, brushing or scraping, for example, or by passing the carrier material over deflecting rollers having small diameters. The thin-layer system having an optically variable effect is therefore detached from the flexible carrier material, while the release layer remains on the carrier material.

The production method known in the prior art, however, entails the disadvantage of the mechanical stressing of the sensitive, optically variable thin-layer system, resulting in damage and therefore in impairment of the optical effect obtained.

The present invention is based on the object, therefore, of providing a method for producing pigments that is improved relative to the prior art. Production is to take place more particularly such as to avoid damage to the thin-layer system. This object is achieved on the basis of the combination of features defined in the independent claim. Developments of the invention are subjects of the dependent claims.

SUMMARY OF THE INVENTION 1. (First aspect of the invention) A method for producing platelet-shaped pigments, comprising the steps of:
   a) providing a film structure which comprises a carrier substrate, a water-soluble release layer and a pigment material layer;
   b) mechanically disrupting the pigment material layer present in the film structure, at specific locations;
   c) soaking the film structure with aqueous solution;
   d) subjecting the film structure to mechanical force, so that the pigment material layer is detached from the carrier substrate as a multiplicity of pigments in accordance with the ruptures present at specific locations.

2. (Preferred embodiment) The method according to paragraph 1, wherein the pigment material layer is a thin-layer system having an optically variable effect.

3. (Preferred embodiment) The method according to paragraph 1 or 2, wherein the aqueous solution in step c) contains at least 90 wt % of water, more preferably at least 95 wt % of water and especially preferably at least 99 wt % of water, with the remaining fraction comprising, in particular, wetting agents and/or organic solvents.

4. (Preferred embodiment) The method according to any of paragraphs 1 to 3, wherein the mechanical disrupting in step b) takes place by means of a printing mechanism, more particularly by means of a printing mechanism having an anilox roll, a gravure cylinder or a nickel cylinder.

5. (Preferred embodiment) The method according to any of paragraphs 1 to 4, wherein the mechanical disrupting in step b) takes place such that the film structure is diverted with tensile stress over an edge breaker, i.e., an elongate body disposed perpendicular to the running direction of the film structure, with the elongate body preferably having a round or triangular or tetragonal cross section.

6. (Preferred embodiment) The method according to paragraph 5 with reference to paragraph 4, wherein the mechanical disrupting in step b) takes place by means of a printing mechanism as a prestructuring measure and additionally thereto such that the film structure is diverted under tensile stress over an edge breaker, i.e., an elongate body disposed perpendicular to the running direction of the film structure.

7. (Preferred embodiment) The method according to any of paragraphs 1 to 6, wherein the soaking of the film structure with aqueous solution in step c) takes place within a wet chamber by spraying using misting nozzles, with the transport path established for the film structure in the wet chamber being preferably an extended, serpentine transport path brought about by deflecting rolls.

8. (Preferred embodiment) The method according to any of paragraphs 1 to 7, wherein the subjecting of the film structure to mechanical force in step d) is realized by the use of ultrasound and/or by the use of brushes and/or by the use of a feltboard or by the use of a felt-covered roll and/or by the use of high-pressure nozzles, and is realized preferably by the use of high-pressure nozzles.

9. (Preferred embodiment) The method according to any of paragraphs 1 to 8, wherein the water-soluble release layer is based on a material selected from the group consisting of polyvinylpyrrolidone, modified starch, polyacrylic acid, polyethylene glycol, hydroxypropylcellulose, hydroxyethylcellulose, casein, gum arabic, carboxymethylcellulose, polyvinyl alcohol, dextrin, or a mixture of two or more of the aforesaid substances.

10. (Preferred embodiment) The method according to any of paragraphs 1 to 9, wherein the water-soluble release layer has an applied weight in a range from 0.05 to 20 g/m$^2$, preferably 0.1 to 10 g/m$^2$, more preferably 0.2 to 5 g/m$^2$.

11. (Preferred embodiment) The method according to any of paragraphs 1 to 10, wherein the water-soluble release layer has a layer thickness in a range from 0.05 to 20 μm, preferably 0.1 to 10 μm, more preferably 0.2 to 5 μm.

12. (Preferred embodiment) The method according to any of paragraphs 1 to 11, wherein the pigment material layer is a thin-layer system having an optically variable effect, specifically a color-flopping thin-layer element which conveys a different perceived color to a viewer at different viewing angles, and optionally has an additionally present magnetic layer for the magnetic orientation of the pigment.

13. (Preferred embodiment) The method according to paragraph 12, wherein the color-flopping thin-layer element has a reflective layer, a dielectric spacer layer and an absorber layer and is preferably formed with a symmetrical multilayer arrangement, with the symmetrical multilayer arrangement having the following layer sequence, in which optionally there may be an additionally present magnetic layer included: absorber layer—dielectric spacer layer—reflective layer—dielectric spacer layer—absorber layer.

14. (Preferred embodiment) The method according to paragraph 13, wherein the color-flopping thin-layer element is formed with a symmetrical multilayer arrangement, with the symmetrical multilayer arrangement having the layer sequence $Cr/SiO_2/Al/SiO_2/Cr$ or the layer sequence $Al/SiO_2/Al/SiO_2/Al$ or the layer sequence $Cr/SiO_2/Al/FeSi/Al/SiO_2/Cr$.

DETAILED DESCRIPTION OF THE PREFERRED EMBODIMENTS

The method of the invention for producing pigments comprises the following steps: providing a film structure which comprises a carrier substrate, a water-soluble release layer and a pigment material layer;
  mechanically disrupting the pigment material layer present in the film structure, at specific locations;
  soaking the film structure with aqueous solution;
  subjecting the film structure to mechanical force, so that the pigment material layer is detached from the carrier substrate as a multiplicity of pigments in accordance with the ruptures present at specific locations.

The pigments are, in particular, effect pigments.

The carrier substrate is, in particular, a carrier film and takes the form preferably of a continuous film. Suitability as carrier film is possessed, for example, by polyethylene terephthalate (PET), polyethylene (PE), polymethyl methacrylate (PMMA) or polycarbonate (PC).

A known practice in the prior art is that referred to as dry stripping, whereby the entire layer structure is subjected to mechanical stressing, by rubbing, brushing or scraping, for example, after which the pigment material layer (herein also called beneficial coating), more particularly a thin-layer system having an optically variable effect, is detached from the carrier substrate, while the release coating or release layer remains on the carrier substrate. The mechanical force exposure here leads to damage to beneficial coating, carrier material or tooling. The production method of the invention, conversely, is distinguished by the complete absence of any unwanted damage to beneficial coating, carrier material or tooling. The production method of the invention is distinguished, furthermore, by the fact that owing to the use of water, there are no risks associated with organic solvents, especially risk of fire or explosion or else toxicity. Accordingly, for the detachment of beneficial coating and for the further processing, such as separation of solvent and beneficial coating, for example, no safety precautions are required. As compared with the use of organic solvents, the water-based production method of the invention entails low costs with regard to the acquisition, processing and preparation of the solvents and of the exposed materials.

The term "stripping" as used herein refers to the detachment of the pigment material layer from the carrier substrate.

The production method of the invention, according to one preferred embodiment, is realized in the form of a roll-to-roll process in which the film structure (also referred to below simply as film), as represented schematically later on below by means of FIG. 6, is guided through a stripping unit as part of sequential operating steps. The sequential operating steps are more particularly the following steps:
  unwinding of the film;
  mechanical disruption of the beneficial coating;
  soaking of the film with aqueous solution;
  exertion of mechanical stress, more particularly mechanical force exposure, on the film;
  collection and pumping-off of the pigment-containing aqueous solution;
  final cleaning of the film;
  rolling-up or winding-up of the film.

After the unrolling or unwinding of the film, the pigment material layer or the beneficial coating (more particularly, the thin-layer system having an optically variable effect) is disrupted by mechanical force exposure in order thereby to enable the ingress of water to the release layer and so to facilitate the detachment of the beneficial coating. This may take place, for example, by means of a printing mechanism with anilox roll, gravure cylinder or nickel cylinder, or similar structured rolls and optionally an impression roll. The microscopic structuring of the structured roll may be such that the beneficial coating, more particularly a metallization, is loaded either randomly or in well-defined shape and size, to generate well-defined pigment particles. The structured roll accordingly features structures having lateral dimensions in the order of magnitude of several micrometers through to several hundred micrometers. Application of water or water-surfactant solutions under pressure in the printing mechanism assists the break-up of the release coating or release layer. In order, alternatively or additionally, to exert a mechanical load on the beneficial coating, the film may be deflected or run under tension over a so-called edge breaker, more particularly an elongate body whose cross-sectional geometry has a very small radius of curvature or an edge (see, for example, FIGS. 3 and 4). The edge breaker causes a random disruption of the beneficial coating in order to accelerate the ingress of water. In order to prevent damage to carrier substrate or carrier film by the edge breaker, it is useful to lubricate with water. A further means of mechanically loading the film and disrupting the beneficial coating is to use, for example, tensioning groups in order to subject the film to mechanical stretching. As a result, the elastic carrier film is stretched by a few percent and the overlying metallized, glasslike layers are ruptured. Furthermore, ultrasound may be used for disrupting the beneficial coating. For that purpose, the film is run through a water-filled tank containing one or more ultrasound probes.

Following the mechanical force exposure, the film is sprayed preferably in a wet chamber with misting nozzles in order to obtain a thin film of water (i.e., wetting film) on the beneficial coating. In order to ensure sufficient exposure time for loosening the release layer or release coating, a long, serpentine pathway is preferably established by deflecting rolls in the wet chamber. Misting nozzles have the advantage that a considerable quantity of water is saved. Moreover, mist is advantageous over direct exposure to water, such as a dipping bath, for example, because water mist is able to enter into the cracks more easily, especially if the water is heated. Moreover, wetting agents such as isopropanol or suitable surfactants, for example, might promote wetting. This process allows relatively high machine speeds and saves a massive amount of water. A further disadvantage of water tanks is the accumulation in the tanks of pigments which have been washed down.

This is followed by the removal of the beneficial coating, more particularly a metallization, from the film by mechanical force exposure. This is realized through the use of ultrasound strips, brushes, through the use of a feltboard, through the use of a roll covered with felt material, and/or, preferably, by means of high-pressure nozzles.

In the subsequent, optional step, the film passes into final cleaning, which is separate from the rest of the wet region.

In this case it is advantageous to spray the film with a water jet on both sides in order to remove pigments which have redeposited on the film during the detachment procedure by means of high-pressure nozzles. An optional final drying takes place thereafter by means of a squeezing mechanism and/or by thermal drying, e.g., by hot air, IR lamp, heated roll or microwaves. The film is subsequently wound up and can be disposed of or reused.

During the stripping process, the detached pigment collects preferably in a bottom tank which is at a slight incline. In this case, the pigment is collected advantageously by means of water flow in the tank at the lowest point and is thereafter transported for further processing by means of a pump. In order to save process water, it is possible here to take water from a circuit, so that little or no fresh water need be used. To prevent accumulation of the release layer or release coating in the process water, it is advantageous to run only a certain proportion of the water in the circuit.

The water-soluble release layer is based preferably on a material selected from the group consisting of polyvinylpyrrolidone, modified starch, polyacrylic acid, polyethylene glycol, hydroxypropylcellulose, hydroxyethylcellulose, casein, gum arabic, carboxymethylcellulose, polyvinyl alcohol, dextrin, or a mixture of two or more of the aforesaid substances.

Application of the water-soluble release layer to the carrier substrate may take place, for example, by dissolution of the water-soluble material in water or in an organic solvent, such as an alcohol, ethyl acetate, methyl ethyl ketone or a mixture thereof, for example, followed by drying. The solution preferably has a solids content in a range from 5 to 70 wt %.

It is advantageous, furthermore, additionally to introduce a radical scavenger and/or inhibitor into the water-soluble release layer, for the inhibition of polymerizations. During the subsequent application of the thin-layer system having an optically variable effect, by vapor deposition, in the course of which metals or else other materials, such as silicon dioxide, are deposited, there occurs not only the coming-about of a relatively high temperature but also the coming-about of UV radiation, x-rays and electron beams. As a result of this hard radiation, in certain circumstances the material used in the water-soluble release layer is cross-linked and hence the solubility of the release layer is diminished. It has been found that the addition of a certain amount of an inhibitor for inhibiting polymerizations and/or of an antioxidant to the formulation of the water-soluble release layer is able advantageously to suppress concretion of the release layer during the thermal evaporation. For this purpose it is advantageous for the inhibitor for inhibiting polymerizations to be present in the water-soluble release layer in a proportion of 0.1 to 10 wt %. For the achievement of particularly advantageous results, the inhibitor for inhibiting polymerizations is selected preferably from the group consisting of a phenol derivative, especially dibutylmethylphenol or butylated hydroxytoluene (BHT), butylated hydroxyanisole (BHA), 4-methoxyphenol (MEHQ), tert-butylmethoxyphenol or a thioether-functionalized phenol derivative, an aromatic amine, alkylated phenyl-alpha-naphthylamine, octylated diphenylamine, butylated diphenylamine, tris(di-tert-butylphenyl) phosphite, 4-hydroxy-2,2,6,6-tetramethylpiperidinyloxyl(4-hydroxy-TEMPO), a tocopherol, more particularly tocopherol acetate, beta-carotene, ubiquinone-10, glutathione, cysteine, thiolactic acid, melatonin, a gallate, more particularly ethyl gallate, propyl gallate, octyl gallate or dodecyl gallate, ascorbic acid, ascorbyl palmitate, ascorbyl stearate, citric acid, a carotenoid, a polyphenolic compound, more particularly a flavonoid, an anthocyanin or a phytoestrogen, or a mixture of two or more of the aforesaid substances.

The water-soluble release layer may be applied by printing, for example, using gravure or flexographic printing, to the carrier substrate. The applied weight of the water-soluble release layer is preferably in a range from 0.05 to 20 $g/m^2$, especially preferably in a range from 0.2 to 5 $g/m^2$.

A preferred layer thickness of the water-soluble release layer generated on the carrier substrate is in a range from 0.05 to 20 μm, especially preferably in a range from 0.1 to 10 μm.

The pigment material layer disposed above the water-soluble release layer is more particularly a thin-layer system having an optically variable effect, and is additionally, in particular, a color-flopping thin-layer element which conveys a different perceived color to a viewer at different viewing angles. The thin-layer system may be generated, for example, by means of a PVD or a CVD method. Color-flopping thin-layer elements are based, for example, on an absorbing layer (e.g., Cr) and on a reflective layer (e.g., Al), with the two layers being spaced apart from one another by an interposed dielectric spacer layer (e.g., $SiO_2$, $MgF_2$ or ZnS).

Furthermore, the thin-layer system having an optically variable effect may more particularly have a symmetrical structure, as for example with the layer sequence $Cr/SiO_2/Al/SiO_2/Cr$ or the layer sequence $Al/SiO_2/Al/SiO_2/Al$. The effect pigments generated after comminution of the thin-layer system have the same optical effect when viewed from the facing side as when viewed from the reverse side, owing to the symmetrical layer structure, and are therefore particularly advantageous.

For separating off the resulting pigments from the process water, it is possible, for example, to use one or more of the following drying techniques: filtering, decanting, centrifuging, heating.

It is of advantage to provide the water-soluble release layer and/or the thin-layer system having an optically variable effect with additives which positively influence the properties of the pigments produced—for example, for improving the corrosion resistance or for modifying the surface properties for further process steps. Suitability for this purpose is possessed, for example, by the following measures: self-assembled monolayers, especially phosphates, phosphoric acid, phosphoric esters, silanes, sol-gel coatings or silicate coatings; stabilizers; pH regulators.

BRIEF DESCRIPTION OF THE DRAWINGS

The invention is elucidated further, below, with reference to the figures, in which.

DETAILED DESCRIPTION OF VARIOUS EMBODIMENTS

Figure 1:
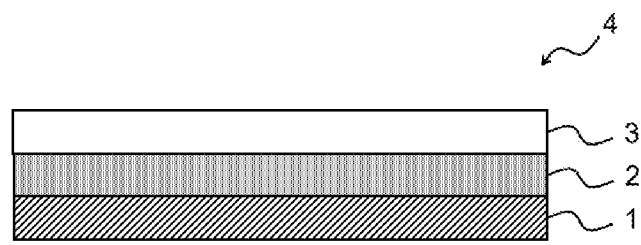
FIG. 1 shows a film structure, comprising a layer system applied over a release layer to a carrier substrate, starting from which the pigments are generated.

FIG. 1 shows a film structure 4, comprising a layer system 3 applied over a release layer 2 to a carrier substrate 1, starting from which the pigments 8 are generated. Serving as carrier substrate 1 is a PET film, present in the form of a continuous film. The carrier substrate 1 has a water-soluble release layer 2. Located above the water-soluble release layer 2 is a pigment material layer 3, namely a thin-layer system having an optically variable effect; in the example, a layer system having the layer sequence $Cr/SiO_2/Al/SiO_2/Cr$.

Figure 2:
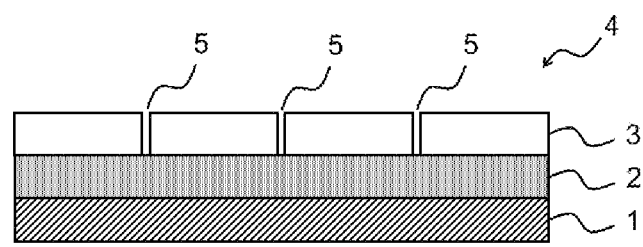
FIG. 2 shows the film structure after the measure of mechanical disruption of the thin-layer system, present in the film structure, at specific locations.

The film structure 4 shown in FIG. 1, which takes the form of a roll or continuous film, is unwound under tension and thereafter disrupted by mechanical force exposure with the aim of enabling the ingress of water to the release layer 2. FIG. 2 shows the film structure 4 after the measure of the mechanical disruption of the thin layer system 3, present in the film structure, at specific locations 5.

The disruption may take place, for example, by means of a printing mechanism with anilox roll. Alternatively or additionally, a mechanical load may be exerted on the thin-layer system 3, by deflecting or passing the film structure 4 under tension over an edge breaker (see the reference number 6 in FIG. 3 and the reference number 7 in FIG. 4).

Figure 3:
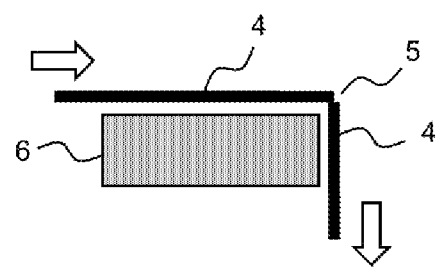
FIG. 3 shows an example of the mechanical disruption, in which the film structure is passed under tensile stress over an edge breaker.

In the case of FIG. 3, the edge breaker 6 is a body having a right-angled edge. The block arrows illustrate the running direction of the film structure 4. The edge breaker 6 causes random disruption of the thin-layer system 3 at specific locations 5.

Figure 4:
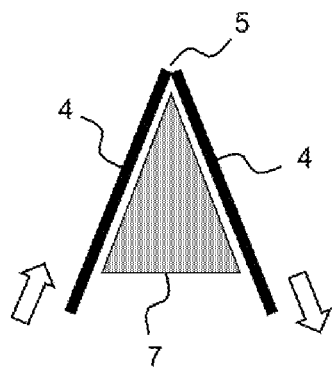
FIG. 4 shows a further example of the mechanical disruption, in which the film structure is passed under tensile stress over an edge breaker.

In the case of FIG. 4, the edge breaker 7 is a body with triangular cross section. The block arrows illustrate the running direction of the film structure 4. The edge breaker 7, by virtue of its acute-angled edge, causes random disruption of the thin-layer system 3 at specific locations 5. The cracks or ruptures 5 need not necessarily have uniform spacing, as indicated in FIG. 4; instead, the cracks or ruptures 5 may also be present at different, randomly distributed intervals.

According to a further exemplary embodiment, which is not shown in the figures, the edge breaker possesses a round cross section with a very small radius of curvature.

The edge breakers represented in the figures are represented with schematic simplification. In reality, the edge is rounded.

A further means of subjecting the film structure 4 to mechanical load and of generating ruptures 5 in the thin-layer system 3 would be, for example, to use tensioning groups in order to cause mechanical stretching of the film 4. As a result, the elastic carrier substrate 1 is stretched by a few percent and the overlying layers of the thin-layer system 3 are ruptured. Furthermore, ultrasound may be used for disrupting the thin-layer system 3.

Figure 5:
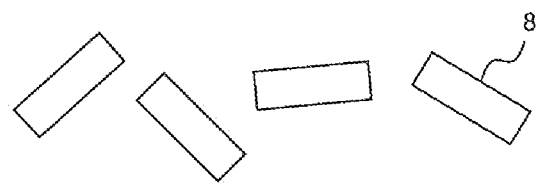
FIG. 5 shows four pigments obtained by the method of the invention.
Figure 6:
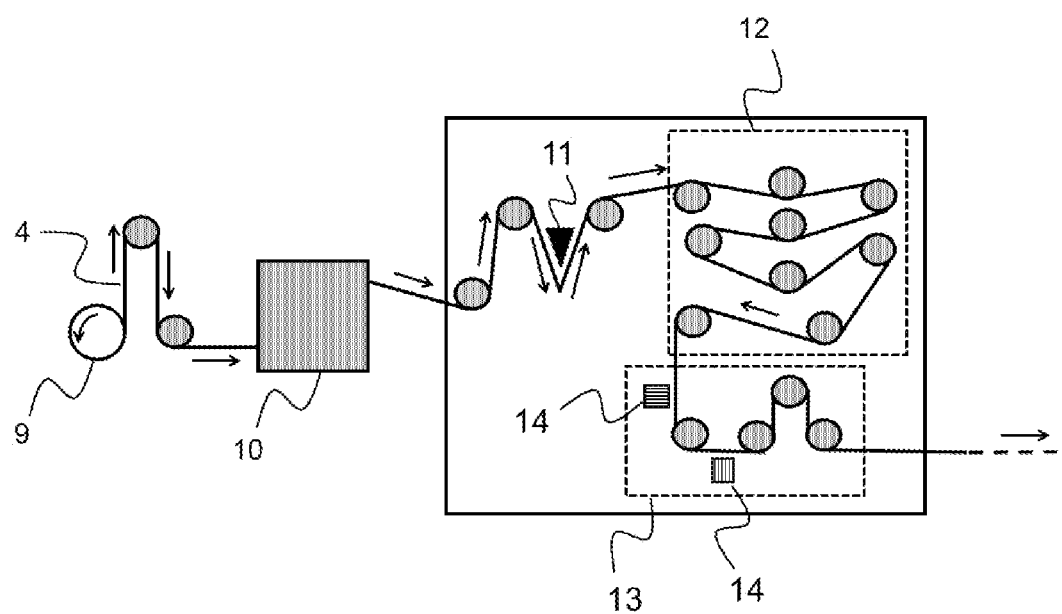
FIG. 6 shows an example of the implementation of the production method of the invention in the form of a roll-to-roll process, wherein the film structure or the film is passed through a stripping unit in sequential operating steps.

FIG. 6 shows an example of the implementation of the production method of the invention in the form of a roll-to-roll process in which the film structure or the film 4 is passed through a stripping unit in sequential operating steps. The film structure 4, in the form of a continuous film, is initially unwound at the unwinder 9 and is placed under tensile stress by successive rolls. In a printing mechanism 10 present optionally, having a structured anilox roll and an impression roll, the thin-layer system 3 may be disrupted at specific locations 5 (see FIG. 2). Alternatively or additionally, disruption of the thin-layer system 3 may be brought about by means of an edge breaker 11. In accordance with the example shown in FIG. 6, the edge breaker 11 is arranged in a wet module. The wet module (outlined in FIG. 6 with a continuous line in the form of a rectangle) comprises, as well as the edge breaker 11, a soaking region 12, represented with dashing, in which the film structure 4 is soaked with aqueous solution, and a cleaning region 13, represented with dashing, in which the film is cleaned by means of brushes 14. In the soaking region 12, the film is sprayed with misting nozzles in order to achieve a thin film of water as wetting film above the thin-layer system 3. In order to ensure a sufficient exposure time for the loosening of the release layer 2, a long, serpentine pathway is established by deflecting rolls. Subsequently, in the cleaning region 13, the thin-layer system 3 is removed from the carrier substrate 1, in order thereby to obtain individual effect pigments 8 (see FIG. 5). According to the example shown in FIG. 6, cleaning is accomplished by the use of brushes 14. Not shown in FIG. 6 is a slightly inclined bottom tank for the collection of the pigments 8. In further steps, which are not depicted in FIG. 6, it is possible optionally for there to be a final cleaning and drying and also the winding-up of the film.

The invention claimed is:

1. A method for producing platelet-shaped pigments, comprising the steps of:
   a) providing a film structure which comprises a carrier substrate, a water-soluble release layer and a pigment material layer;
   b) mechanically disrupting the pigment material layer present in the film structure, at specific locations;
   c) soaking the film structure with aqueous solution by spraying using misting nozzles;
   d) subjecting the film structure to mechanical force, so that the pigment material layer is detached from the carrier substrate as a multiplicity of pigments in accordance with ruptures that are present at specific locations.

2. The method of claim 1, wherein the pigment material layer is a thin-layer system having an optically variable effect.

3. The method of claim 1, wherein the aqueous solution in step c) contains at least 90 wt % of water, with the remaining fraction comprising wetting agents and/or organic solvents.

4. The method of claim 1, wherein the mechanical disrupting in step b) takes place by means of a printing mechanism having an anilox roll, a gravure cylinder or a nickel cylinder.

5. The method of claim 1, wherein the mechanical disrupting in step b) takes place such that the film structure is diverted with tensile stress over an edge breaker, including an elongate body disposed perpendicular to the running direction of the film structure, with the elongate body having a round or triangular or tetragonal cross section.

6. The method of claim 5, wherein the mechanical disrupting in step e) step b) takes place by means of a printing mechanism having an anilox roll, a gravure cylinder or a nickel cylinder;
   wherein the mechanical disrupting in step b) takes place by means of a printing mechanism as a prestructuring measure and additionally thereto such that the film structure is diverted under tensile stress over an edge breaker, including an elongate body disposed perpendicular to the running direction of the film structure.

7. The method of claim 1, wherein the soaking of the film structure with aqueous solution in step c) takes place within a wet chamber, with a transport path established for the film structure in the wet chamber being an extended, serpentine transport path brought about by deflecting rolls.

8. The method of claim 1, wherein the subjecting of the film structure to mechanical force in step d) is realized by the use of ultrasound and/or by the use of brushes and/or by the use of a feltboard or by the use of a felt-covered roll and/or by the use of high-pressure nozzles.

9. The method of claim 1, wherein the water-soluble release layer is based on a material selected from the group consisting of polyvinylpyrrolidone, modified starch, polyacrylic acid, polyethylene glycol, hydroxypropylcellulose, hydroxyethylcellulose, casein, gum arabic, carboxymethylcellulose, polyvinyl alcohol, dextrin, or a mixture of two or more of the aforesaid substances.

10. The method of claim 1, wherein the water-soluble release layer has an applied weight in a range from 0.05 to 20 g/m2.

11. The method of claim 1, wherein the water-soluble release layer has a layer thickness in a range from 0.05 to 20 µm.

12. The method of claim 1, wherein the pigment material layer is color-flopping thin-layer element which conveys a different perceived color to a viewer at different viewing angles, and optionally has an additionally present magnetic layer for the magnetic orientation of the pigment.

13. The method of claim 12, wherein the color-flopping thin-layer element has a reflective layer, a dielectric spacer layer and an absorber layer and is formed with a symmetrical multilayer arrangement, with the symmetrical multilayer arrangement having the following layer sequence, in which optionally there is an additionally present magnetic layer included: absorber layer-dielectric spacer layer-reflective layer-dielectric spacer layer-absorber layer.

14. The method of claim 13, wherein the color-flopping thin-layer element is formed with a symmetrical multilayer arrangement, with the symmetrical multilayer arrangement having the layer sequence Cr/SiO2/Al/SiO2/Cr or the layer sequence Al/SiO2/Al/SiO2/Al or the layer sequence Cr/SiO2/Al/FeSi/Al/SiO2/Cr.

* * * * *